Mar. 3. 1925.

Re. 16,009

A. G. F. KUROWSKI

TYPEWRITING MACHINE

Original Filed Oct. 15, 1920

Inventor:
Alfred G. F. Kurowski
by B. B. Stickney
Attorney

Reissued Mar. 3, 1925. Re. 16,009

UNITED STATES PATENT OFFICE.

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

Original No. 1,468,641, dated September 25, 1923, Serial No. 417,192, filed October 15, 1920. Application for reissue filed January 14, 1925. Serial No. 2,401.

*To all whom it may concern:*

Be it known that I, ALFRED G. F. KUROWSKI, a citizen of the United States, residing in Brooklyn Borough, in the county of Kings, city and State of New York, have invented certain new and useful Improvements in Typewriting Machines; and I do hereby declare the following to be a full, clear, and exact description of the invention, such as will enable others skilled in the art to which it appertains to make and use the same.

This invention relates to the line-spacing mechanism of typewriting machines, particularly those of the type known as the Underwood standard portable typewriter. The main object of the invention is to secure increased convenience and ease of operation of the line-spacing mechanism. Other and more particular objects are to secure these above noted advantages without interfering with the compact enclosure of the portable machine within the usual protective cover or carrying case provided for these machines, and without increasing the number of operations heretofore required in closing the cover into place on the machine, or in opening or removing the cover part of the casing. The invention includes a long line-space lever which may be pivoted on a vertical pivot to swing in the direction of the return of the usual carriage or platen-frame, and to extend forward for some distance to the front of the platen-frame, so as to be both conveniently and easily operated, and a finger-piece forming a tip movably mounted on the forward end of the line-space lever at a point well forward of the platen and platen-frame, and having a normal tendency, such as by being spring-pressed to rise to an upstanding position of use in which it projects or stands elevated above other parts of the machine, but which may be pressed down by the cover or casing to a lower position in compact relation to the forward end of the line-space lever, so as to provide for the enclosure of the machine within its usual cover or carrying case, and which will rise automatically to its upstanding position when the pressure thereon of the cover is removed. Therefore, only the two usual operations of closing or putting on the cover, and of opening or taking it off are required.

Other features and advantages will hereinafter appear

In the accompanying drawings.

Figure 1:
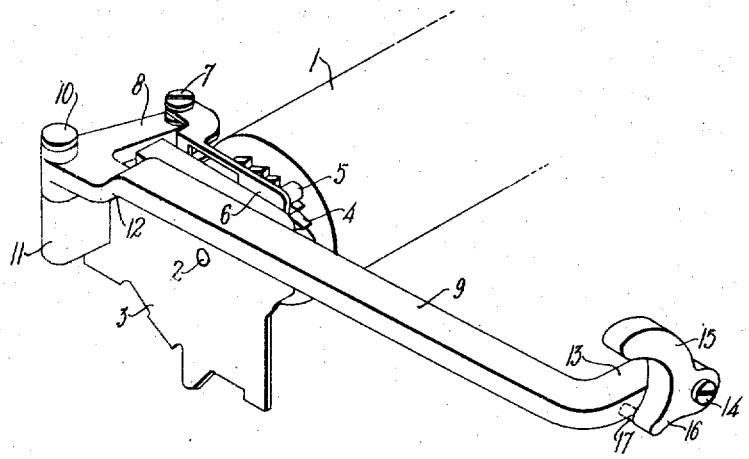
Figure 1 is a perspective view of the left end of the platen frame and platen of an Underwood portable typewriting machine having embodied therein the improved line-spacing mechanism of the present invention.
Figure 2:
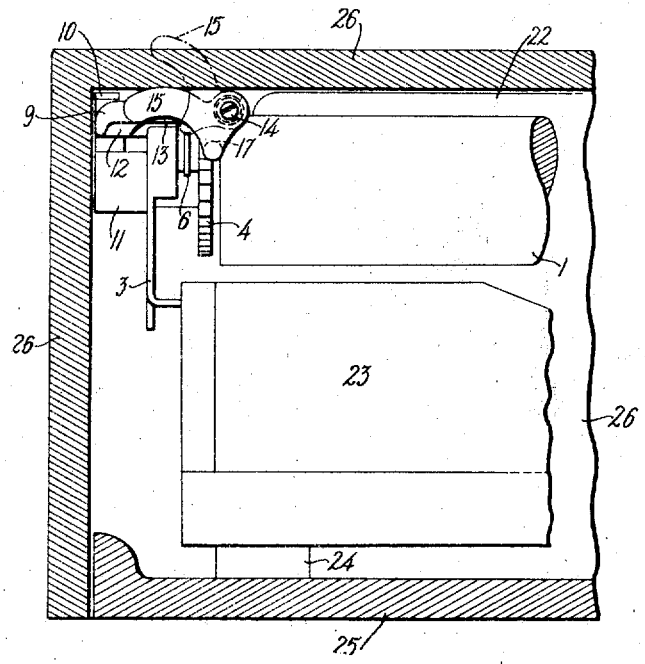
Figure 2 is a front elevation, with parts omitted, of the left end of the machine enclosed within its casing, which is shown in transverse vertical section.
Figure 3:
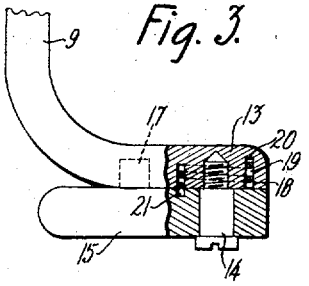
Figure 3 is an enlarged view of the forward end of the line-space lever and the foldable finger-piece carried thereby, shown partly in plan view and partly in horizontal section, to illustrate the mounting of the foldable finger-piece.

In the embodiment of the invention illustrated in the drawings, a usual platen 1 is journaled by means of its axle 2 in a usual platen frame, or carriage, of which the left end wall 3 appears in Figures 1 and 2. The platen 1 is provided with a usual line-space wheel 4, the teeth of which are engageable by an actuating stud 5 projecting laterally from the free end of a line-space pawl 6, pivoted at 7 to an inwardly-extending lever arm 8 shown as forming part of a forwardly-extending line-space lever 9 which is pivoted by means of a vertical pivot-stud 10 on a lug 11 projecting from the outer side of the rear part of the end wall 3 of the platen frame. Near the pivot-stud 10, the line-space lever 9 is shown as slightly offset upwardly at 12 in order to clear the top of the end wall 3 of the platen frame, and from this offset 12 the line-space lever 9 is straight and extends substantially horizontally forward beyond the end wall 3 to a point within easy reach of the operator, above and at the back of the usual keyboard of the machine, and by reason of its length provides sufficient leverage to assure ease of operation in its line-spacing movement, which will be toward the right from the normal position of this lever 9 shown in the drawings, or in the direction of the return movement of the carriage, for also returning the latter to begin the writing of a new line; the lever turning on a vertical pivot.

At its forward end the long line-space lever 9 bends on a curve or turns inwardly horizontally toward the right to form an end part 13 which is at right angles to the main lever part 9, and which, in the normal position of the line-space lever shown in the drawings, is substantially parallel to the platen 1. The end of this transverse lever part 13 is provided at the front thereof with a shouldered screw-stud 14 forming a horizontal pivotal support for a finger-piece 15, forming a tip on the end of the line-space lever at a point well forward of the platen and platen frame, and which in its normal upstanding position rises from a point to the left of the pivot-stud 14 on a curve laterally toward the left, so that the upper rounded end of this finger-piece 15 occupies a position at an angle of about forty-five degrees upward and to the left of the axis of the pivot-stud 14, as shown in full lines in Figure 1 and in broken lines in Figure 2. A heel-part 16 forms a short downward continuation of the inner curve of the finger-piece 15 below and at the left of the pivot-stud 14, and this heel-part 16 carries a rearwardly-projecting stop-lug 17 which normally abuts against the lower side of the transverse end part 13 of the line-space lever 9 to prevent the finger-piece 15 from turning over toward the right when pressure is applied to effect a line-spacing operation, but permitting the finger-piece 15 to be folded toward the left and downwardly alongside of and in compact relation to the lever end part 13 from the broken-line position indicated in Figure 2 to the full-line position there shown.

A coiled torsion spring 18 is contained and concealed within a circular channel 19 formed in the front face of the lever end part 13, the rear end of this spring 18 being anchored to the lever end 13 in a recess 20 at the bottom of the channel 19, and the other or forward end of this spring being turned outwardly and received into a recess 21 in the adjacent face of the finger-piece 15, the spring 18 being arranged to exert a clockwise torque on the finger-piece 15 as viewed from the front, for thereby normally yieldingly holding the stop-lug 17 against the lever part 13 with the finger-piece 15 in its normal upstanding position of use, shown in Figure 1 in full lines and as indicated in broken lines in Figure 2. By reason of this construction, the finger-piece 15 will have a tendency to, and will normally occupy, an upstanding position ready for use to effect a line-spacing operation, but may be pressed downward to the above-described position of non-use from which it will automatically return when released to the normal upstanding position of use.

In its upstanding position of use, the finger-piece 15 projects substantially throughout its full length above other elevated parts of the machine, such for example, as the upper end of the pivot-stud 10 and the top of the usual paper-table 22 which forms a part of the platen frame, and as will be clear from an inspection of Figure 2. In Figure 2, the lower or main body part 23 of the typewriting machine is shown diagrammatically in outline below the platen 1 and supports the end wall 3 and other parts of the platen frame, together with the parts carried thereby. The main body part 23 of the typewriter is provided with the usual supporting pads or legs 24 for supporting the typewriting machine, which is shown as supported upon a flanged base 25 to which it may be rigidly secured in any suitable way, such as by means of screws, not shown. The supporting base 25 forms the bottom of a casing for completely enclosing and protecting the typewriting machine, and of which a box-like casing part or cover 26 forms the remainder of the complete casing. The cover part 26 may be removably secured in place on the bottom or base part 25 by any suitable means, not shown, but well understood in the art. When the cover part 26 is placed in position over the machine, the top wall of this cover part 26, as this cover is pushed down to the final position thereof shown in Figure 2, will come in contact with the rounded upper end of the upstanding finger-piece 15, and as the cover part 26 descends will push the finger-piece 15 angularly downward from the upstanding position of use thereof shown in Figure 1 and indicated in broken lines in Figure 2, to the compact folded position of non-use thereof shown in full lines in Figure 2, below and in contact with the inner surface of the top wall of the enclosing cover part 26 of the casing.

After the cover part 26 has been secured in place on the base part 25 of the casing, the closed casing with the typewriter firmly held therein may be conveniently carried in like manner to a small suitcase by means of a suitable loop handle provided for that purpose, and as is well understood by those familiar with portable typewriting machines. The base part or bottom 25 usually forms one of the larger sides of the enclosing case, and the top wall of the cover part 26 forms the opposite larger side of the casing. When the machine is to be used the casing rests upon its base 25, and the enclosing upper cover part 26 is removed, whereupon the spring-pressed finger-piece 15 will then automatically rise from its folded position of non-use shown in full lines in Figure 2 to the upstanding position of use thereof shown in broken lines in Figure 2 and in full lines in Figure 1.

In the operation of the device it will be clear from the foregoing description that the long forwardly-extending line-space lever 9 with its transversely turned forward end part 13, provided with the normally upstanding foldable finger-piece 15, provides both easy and convenient means for operating the line-spacing mechanism, and returning the carriage, and also provides for the safe, compact and complete enclosure of the typewriting machine within its usual carrying case comprising the base part 25 and the cover part 26.

Also, in the operation of the device, it is to be noted that it is only necessary to place the cover 26 over the machine in the usual way when it is desired to protect or carry the machine, and merely to remove this cover in the usual way when the machine is to be used.

Variations may be resorted to within the scope of the invention, and portions of the improvements may be used without others.

Having thus described my invention, I claim:

1. In a typewriting machine having a rotative platen, line-spacing mechanism therefor, including an upstanding finger-piece mounted for movement to a lower position when out of use, said finger-piece having a normal tendency to rise to its upstanding position and being adapted to be pressed downward to its lower position of non-use by a cover for the machine and to rise automatically to its upstanding position of use when the pressure of the cover is removed.

2. In combination, in a typewriting machine having a rotative platen and a casing for the machine, line-space mechanism for the platen, including a finger-piece adapted to be pressed from normal position to a position of non-use by a section of the casing enclosing the latter, and means for automatically returning the finger-piece to its normal position, for operation thereof, when the casing is removed from the finger-piece.

3. In combination, in a typewriting machine, a rotative platen and line-spacing mechanism for the platen including a forwardly-extending line-space lever, a normally upstanding downwardly-movable finger-piece movably mounted on the forward end of the line-space lever, and yielding means for automatically returning the finger-piece from a lowered to the upstanding position and for normally holding it at the upstanding position; and a cover for the machine engageable with the upstanding finger-piece to press it downward to its lowered position when the cover is placed on the machine, and enabling said yielding means to return the finger-piece to its upstanding position when the cover is lifted from the machine.

4. In combination, in a typewriting machine, a rotative platen and line-spacing mechanism for the platen including a forwardly-extending line-space lever and a normally-upstanding downwardly-foldable finger-piece pivotally mounted on the forward end of the line-space lever, said finger-piece having a normal tendency to swing to its upstanding position and being adapted to be pressed downward to its folded position by a cover for the machine and to rise automatically to its upstanding position when the pressure of the cover is removed.

5. In combination, in a typewriting machine, a rotative platen and line-spacing mechanism for the platen including a forwardly-extending horizontally-movable line-space lever provided with a lateral inwardly-extending forward end part, and a normally-upstanding finger-piece pivoted to said inwardly-extending end part of the line-space lever to fold laterally outwardly and downwardly to a position of non-use alongside of said inwardly-extending end part of the line-space lever, said finger-piece having a normal tendency to swing to its upstanding position and being adapted to be pressed downward to its folded position by a cover for the machine and to rise automatically to its upstanding position of use when the pressure of the cover is removed.

6. In combination, in a typewriting machine, a rotative platen and line-spacing mechanism for the platen including a forwardly-extending horizontally-movable line-space lever provided with a lateral inwardly-extending forward end part, an upwardly and laterally outwardly curved finger-piece normally upstanding from the line-space lever and pivoted on said inwardly-extending end part of the line-space lever to fold laterally outward and downward alongside thereof, and yielding means for automatically returning the finger-piece to and for normally holding it at the upstanding position; and a cover for the machine engageable with the upstanding finger-piece to press it downward to its folded position when the cover is placed on the machine and to enable said yielding means to return the finger-piece from its folded to its upstanding position when the cover is lifted.

7. In combination, in a typewriting machine, a rotative platen, a platen frame in which the platen is journaled, and line-spacing mechanism for the platen including a line-space lever pivoted on the platen frame and projecting forward from the platen frame, an upstanding downwardly-foldable finger-piece pivotally mounted on the forward end of the line-space lever, and yielding means for automatically returning the finger-piece from its folded to its upstanding position and for normally holding it at the upstanding position; and a cover for the machine engageable with the upstanding finger-piece to press it down to the folded position when the cover is placed on the machine, whereby the finger-piece may project for line-spacing use and may fold out of the way of the cover.

8. In combination, in a typewriting machine, a rotative platen, a platen frame in which the platen is journaled, and line-spacing mechanism for the platen including a horizontally-movable line-space lever pivoted on and extending forward from one end of the platen frame, the line-space lever being provided with a forward end part extending from the main part of the lever transversely horizontally inward, and an upwardly and laterally outwardly curved finger-piece pivoted to the said transversely extending end part of the line-space lever, so as to fold laterally outward and downward alongside of said transversely-extending end part of the line-space lever to a position of non-use, said finger-piece having a normal tendency to move automatically to its upwardly projecting position of use.

9. In combination, in a typewriting machine, a rotative platen, a platen frame in which the platen is journaled, and line-spacing mechanism for the platen including a horizontally-movable line-space lever pivoted on and extending forward from one end of the platen frame, the line-space lever being provided with a forward end part extending from the main part of the lever horizontally inward substantially at right angles to the main part of the lever, an upwardly and laterally outwardly curved finger-piece pivoted to the said inwardly-extending end part of the line-space lever, so as to fold laterally outward and downward alongside of said inwardly-extending end part of the line-space lever to a position of non-use, and a spring concealed between the said inwardly-extending end part of the line-space lever and the finger-piece for rocking the latter upon its pivot from its folded position of non-use to its upstanding position of use and for normally yieldingly holding it at this position of use.

10. In combination, in a typewriting machine, a rotative platen, a platen frame in which the platen is journaled, and line-spacing mechanism for the platen including a horizontally-movable line-space lever pivoted on and extending forward from one end of the platen frame, the line-space lever being provided with a forward end part extending from the main part of the lever horizontally inward substantially at right angles to the main part of the lever, and upwardly and laterally outwardly curved normally upstanding finger-piece pivoted to the said inwardly-extending end part of the line-space lever, so as to fold laterally outward and downward alongside of said inwardly-extending end part of the line-space lever to a position of non-use, a coiled torsion spring surrounding the pivotal axis of the finger-piece and concealed between the finger-piece and the adjacent inwardly-extending end of part of the line-space lever for normally moving the finger-piece to and normally holding it at the upstanding position of use, and abutment means for stopping the foldable finger-piece at its upstanding position of use.

11. In combination, a typewriting machine having a carriage and a rotative platen thereon, and also having line-spacing and carriage-returning means, including an elevated finger-piece on said carriage, and a cover for the machine engageable with said finger-piece, the latter being foldable compactly down from normal position by said cover, and means associated with said carriage for holding said finger-piece in elevated normal position; said holding means being yielding, thereby permitting the cover to effect the folding.

12. In combination, in a typewriting machine, a rotative platen, a line-spacing mechanism for the platen including a line-space lever extending forwardly from a vertical pivot, a normally elevated finger-piece on said lever forward of said pivot, said finger-piece mounted on said lever by means of a horizontal pivot to fold downwardly, and means normally holding said finger-piece in elevated position.

13. In combination, in a typewriting machine, a rotative platen, a line-spacing mechanism for the platen including a line-space lever extending forwardly from a vertical pivot, a normally elevated finger-piece on said lever forward of said pivot, said finger-piece mounted on said lever by means of a horizontal pivot to fold downwardly, and means normally holding said finger-piece in elevated position, and a cover for the machine engageable with the elevated finger-piece to press it downward about said horizontal pivot in the act of dropping the cover over the machine.

ALFRED G. F. KUROWSKI.

Witnesses.
JENNIE P. THORNE,
MARGARET G. NOONAN.